(No Model.)
P. L. STOMBAUGH.
DEVICE FOR PREVENTING HORSES FROM CRIBBING.
No. 510,722. Patented Dec. 12, 1893.
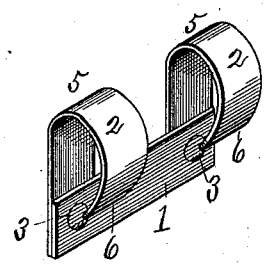
Fig. I.
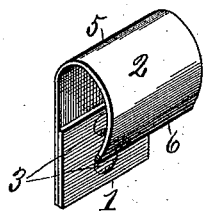
Fig. II.
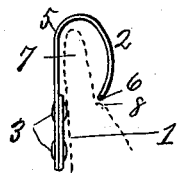
Fig. III.
Attest:
Albert M. Eberszole
E. S. Knight
Inventor:
Parley L. Stombaugh
By Knight Bros.
Attys.

UNITED STATES PATENT OFFICE.

PARLEY L. STOMBAUGH, OF ALTAMONT, ILLINOIS.

DEVICE FOR PREVENTING HORSES FROM CRIBBING.

SPECIFICATION forming part of Letters Patent No. 510,722, dated December 12, 1893.

Application filed April 1, 1893. Serial No. 468,652. (No model.)

*To all whom it may concern:*

Be it known that I, PARLEY L. STOMBAUGH, of Altamont, in the county of Effingham and State of Illinois, have invented a certain new and useful Improvement in Devices for Preventing Horses from Cribbing, of which the following is a full, clear, and exact description, reference being had to the accompanying drawings, forming part of this specification.

My invention relates to a device for the prevention and cure of horses addicted to the habit of cribbing or wind sucking, which I accomplish without injury to the animals, or without inconveniencing them in the eating of soft food, but which device will, in a short time after it has been in use successfully prevent the animal from biting into hard substances.

Figure I is a perspective view of my improved device, where two spring clips are used. Fig. II is a perspective view showing the use of but one spring clip. Fig. III is an edge view, illustrating the device, in using position on a horse's tooth.

Referring to the drawings, 1 represents a plate, and 2 a spring clip, one end of said clip being secured to the plate 1 by means of a rivet 3, or other suitable means, as shown in Fig. I, or by two rivets, as shown in Fig. II. From its attachment to the plate the clip extends upward to a point 5, from which point it gradually curves downward, leaving the free end 6, allowing the device to be readily passed over a horse's tooth, illustrated at 7, when the free end of the spring clip is in contact, or nearly so with the gum, illustrated at 8, at the inner base of the tooth. (See Fig. III.)

The habit of cribbing varies with different animals, in that some bear upon a hard substance with the lower teeth, and others press downward with the upper teeth, and again others on the side teeth. My device may be readily applied in either case, by pressing the sides of the clip together, or spreading the sides of the clip apart, and passing it over the tooth 7, so that the plate 1 will bear against the outer edges of the horse's jaw, while the inner edge 6 of the clip bears upon the gum, as seen at 8, Fig. III. Thus it will be seen that the device will be covered by the outer part of the lip of the horse. The inner edge of the clip 2 will bear upon the gum, so that when the animal is inclined to bite upon hard substances, such as wood, the edge 6 will come in direct contact and be pressed up or down, as the case may be, when applied to the upper or lower jaw, and thus the pressure applied at the point 5 causes the free end of the clip to bear upon the inner side of the gum 8, and by the pain thereby inflicted, the animal is caused to discontinue the biting of the hard substance, and after use for a short time of the device, a permanent cure of the vicious habit of cribbing is established.

In Fig. I I have shown two of the spring clips attached to a single plate, this form being adapted to apply to two teeth, which is designed for use on horses that have acquired the habit to a very vicious extent, and therefore are with more difficulty caused to desist from the habit.

I claim as my invention—

A device for preventing horses from cribbing which consists of a plate 1 and a spring clip 2 of U-shape secured to one side of the plate at one edge and extending above the plate so as to present a free edge which bears against the gum at the back of the teeth; substantially as described.

PARLEY L. STOMBAUGH.

In presence of—
G. B. H. BAKER,
S. J. RICE.